March 16, 1954   J. B. HOLLIDAY   2,672,248
TOBACCO HARVESTER

Filed Oct. 9, 1953   4 Sheets-Sheet 1

Jim B. Holliday
INVENTOR.

BY Clarence A. O'Brien
and Harvey B. Jacobson
Attorneys

March 16, 1954   J. B. HOLLIDAY   2,672,248
TOBACCO HARVESTER
Filed Oct. 9, 1953   4 Sheets-Sheet 2

Jim B. Holliday
INVENTOR.

March 16, 1954 J. B. HOLLIDAY 2,672,248
TOBACCO HARVESTER
Filed Oct. 9, 1953 4 Sheets-Sheet 3

Jim B. Holliday
INVENTOR.

BY Clarence A. O'Brien
and Harvey B. Jacobson
Attorneys

March 16, 1954   J. B. HOLLIDAY   2,672,248
TOBACCO HARVESTER
Filed Oct. 9, 1953   4 Sheets-Sheet 4
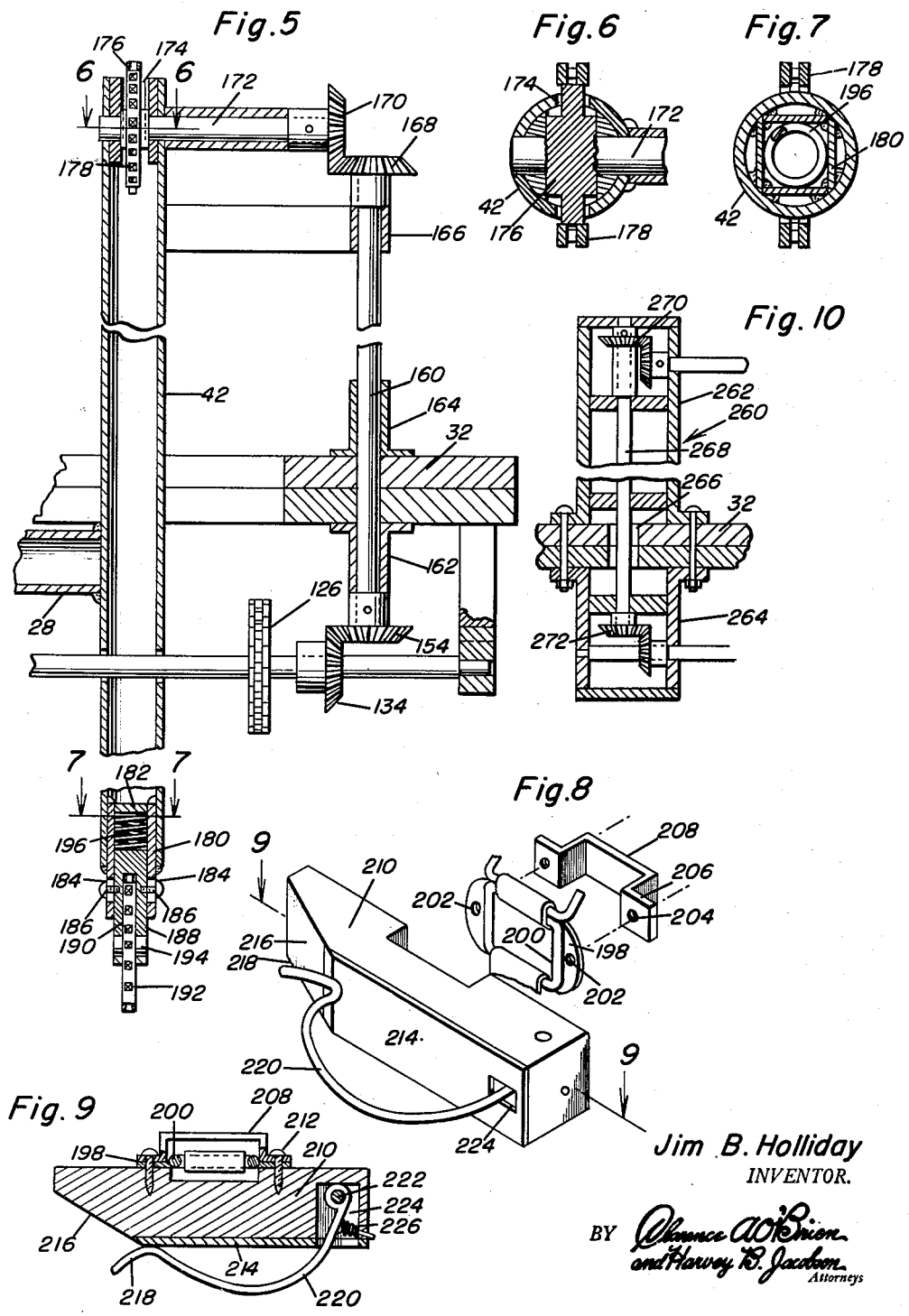
Jim B. Holliday
INVENTOR.

Patented Mar. 16, 1954

2,672,248

UNITED STATES PATENT OFFICE 2,672,248

TOBACCO HARVESTER

Jim B. Holliday, Jamesville, N. C.

Application October 9, 1953, Serial No. 385,051

7 Claims. (Cl. 214—357)

This invention relates to an agricultural implement and more particularly to a novel tobacco harvester.

As it is well known, tobacco leaves must be picked by hand since only certain leaves of each plant are sufficiently matured for harvesting. Therefore, the present invention incorporates means for supporting and seating at a correct level and comfortable manner, the seats being positioned adjacent vertically extending conveyor chains for carrying the tobacco leaves upwardly to an upper level where there is provided an apparatus, as disclosed in the co-pending application, Serial No. 395,459, filed December 1, 1953, for Tobacco Stick Tying Apparatus.

Another feature of the invention resides in the provision of a tobacco harvester having an upper platform for supporting the operator of the vehicle so that he may both operate the harvester while supervising the operation of the tobacco leaf pickers and other personnel carried by the harvester.

Another object of this invention resides in the provision of vertically extending members for supporting vertically extending conveyor chains adjacent seats for leaf pickers, the seats being suspended from the vertical members adjacent to and behind the conveyor chains.

One form of this invention includes the concept of resiliently mounting the conveyor chain so as to prevent accidents should the fingers of the leaf picker or portions of his clothing become caught in the conveyor chains.

Another form of the invention includes the concept of having concentric and coaxial tubular vertical members and driven shafts for actuating the conveyor chains whereby the leaf pickers will be protected from the rotating shafts.

The conveyor chains utilized in this invention extend vertically from below the upper platform to a point thereabove and have attached thereto clips for holding the tobacco leaves and conveying them upwardly. These clips are preferably formed from brass or covered therewith to resist the deleterious action of the juices exuded from the tobacco leaves which causes the leaves to otherwise adhere to the clips.

Another feature of the invention resides in the provision of drive means for the conveyor chains which may be operated from sprockets mounted on the wheel axles of the harvester whereby the conveyors on either side or both sides may be operated individually or simultaneously.

Yet another object of this invention resides in the provision of means for adjustably supporting seats at a given height above the ground whereby the picket may more comfortably pick tobacco leaves from the tobacco plants, the height at which the seats are adjusted being dependent upon the approximate height of the mature leaves.

Still further objects and features of this invention reside in the provision of a tobacco harvester that includes a front wheel drive for self propulsion whereby the operator of the harvester can be seated at the front end of the harvester for steering and controlling the operation thereof. The harvester comprising the present invention is strong and durable, relatively simple in construction and manufacture, while being highly effective in positioning the leaf picker adjacent the crop.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is an enlarged sectional detail view illustrating the construction of the vertical members and associated driving means for the conveyor chains;

Figure 6 is a sectional detail view as taken along the plane of line 6—6 in Figure 5;

Figure 7 is a horizontal sectional detail view as taken along the plane of line 7—7 in Figure 5 and illustrating the means for resiliently mounting the conveyor chains relative to the vertical members;

Figure 8 is an exploded perspective view illustrating the construction of one of the resilient clips utilized in carrying the tobacco leaves;

Figure 9 is a sectional view as taken along the plane of line 9—9 in Figure 8; and Figure 10 is a sectional detail view illustrating a modified form of a vertical member and drive means for the conveyor chains.

Figures 3, 4:
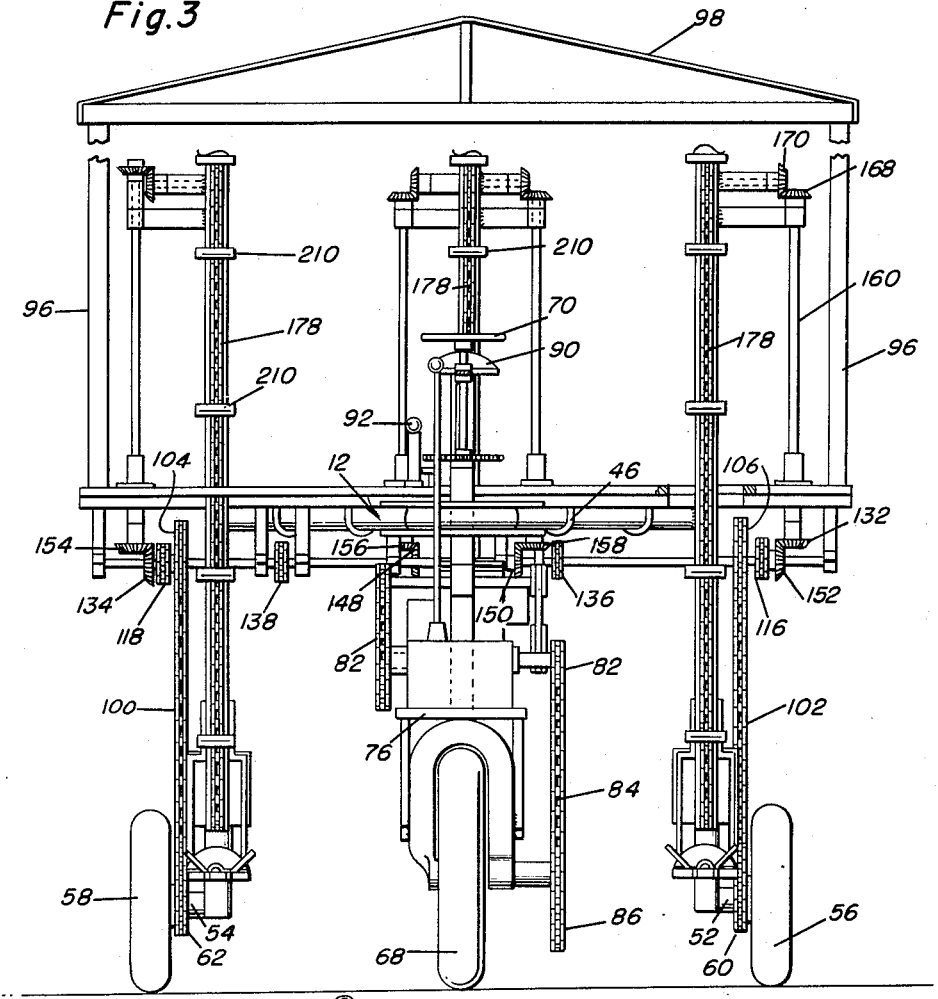
Figure 3 is a front elevational view of the harvester.
Figure 4 is a perspective view illustrating the construction of the frame and associated vertical members.

With continuing reference to the accompanying drawings wherein like reference numerals designate like parts throughout the various views, reference numeral 10 designates the tobacco harvester comprising the present invention. The tobacco harvester is provided with a main frame 12, the structure of which can be best seen in Figure 4. The frame 12 includes a pair of side frame members 14 and 16 which are joined by transverse members 18, 20, 22, and 24, the transverse members being substantially horizontal as are the horizontal members 26 and 28. The base plate 30 is secured to the frame 12 at the front end thereof, it being noted that the side frame member 14 and 16 converge forwardly. An upper platform 32 is secured on the frame 12 and provides means for supporting various personnel on the harvester. A supporting plate or platform 34 is provided for the front end of the frame and for supporting both the operator of the tractor and the various control mechanisms utilized in operating the tractor.

Welded or otherwise secured to the transverse members 20 and 22 and the horizontal members 21 and 28 are vertical members 36, 38, 40 and 42, which are preferably tubular in shape. These vertical members 36, 38, 40 and 42 provide the main structural supports for the conveyor chains of the invention.

The platform 32 is formed with a plurality of transverse ribs 44 forming the strength members of the platform 32. Other floorboards or the like may be secured on ribs 44 to complete the platform. The platform 32 is secured to the frame 12 by means of U-bolts 46 extending through the ribs 44 and embracing the side frame members 14 and 16, or any of the transverse members 18, 20, 22, or the horizontal members 26 and 28.

Welded to the frame 12 are a pair of downwardly extending standards 48 and 50. Stub axles 52 and 54 are secured to the standards 48 and 50 and carry stub shafts on which rear wheels 56 and 58 are mounted as well as sprockets 60 and 62. The sprockets 60 and 62 provide means for operating the chain drive arrangements forming important elements of the invention.

For providing self propulsion for the invention there is provided a vertically extending standard 64 which is journaled in the plates 30 and 32 of the frame 12 and which carries an axle 66 on which a front wheel 68 is journaled. The standard 64 may be rotated by means of a steering wheel 70 which is connected by a spur 72 and gear 74 arrangement. Mounted on the standard 64 is a bracket 76 supporting a gasoline engine 78 which is connected by suitable endless belts 80 and chains 82 and 84 together with the associated pulleys on sprockets to drive a large sprocket 86 mounted on the shaft carrying the wheel 68, the shaft providing the means for journaling the wheel 68 in the axle 66. The shaft is designated by reference numeral 88. A seat 90 is provided for the operator of the vehicle adjacent the steering wheel 70 and clutch operating mechanism 92 together with an accelerator pedal 94 are placed adjacent the seat 90 so that the operator may more easily control the operation of the harvester.

By means of suitable post or standards such as are indicated at 96, a canopy 98 of suitable construction, preferably light in weight is supported above the platform 32 thereby providing shade for the personnel of the tractor while also providing some protection against inclement weather.

The sprockets 60 and 62 have entrained thereon endless chains 100 and 102 which are entrained about sprockets 104 and 106 mounted on stub shafts, each of which carry a friction plate clutch assembly, as at 108, and 110, to drive stub shafts 112 and 114 carrying sprocket wheels about which the endless chains 116 and 118 are positioned. Thus, the power take-off from the sprockets 60 and 62 can be controlled by the personnel of the planter using clutch actuating levers 120 and 122.

The endless chains 116 and 118 drive sprockets 124 and 126 mounted on shafts 128 and 130 carrying beveled gears 132 and 134. The shafts 128 and 130 also have sprockets, as at 133 and 135 mounted thereon for driving endless chains 136 and 138 which are also entrained about the sprockets 140 and 142 mounted on shafts 144 and 146. The shafts 144 and 146 carry bevel gears 148 and 150, respectively.

It is thus noted that there may be selectively rotated the beveled gears 132 and 134 and 148 and 150 all of which rotate about the horizontal axis and which are adapted to drive beveled gears 152, 154, 156 and 158 mounted on vertically extending shafts for driving vertical conveyor chains, each of which is substantially identical in construction and which for the purpose of simplicity and clarity can be best described with particular attention being had to Figure 5.

The vertically extending shafts as represented by reference numeral 160 are journaled in bearings 162 and 164 above and below the platform 32 and in bearing supports 166 extending outwardly from the vertical member. The shaft 160 carries a beveled gear 168 adapted to engage another beveled gear 170 mounted on a shaft 172 journaled in the vertical member 42. It is noted that the upper end of the tubular vertical member 42 is provided with a recess 174 therein for reception of the upper sprocket 176 about which the endless conveyor chain 178 is entrained. At the lower end of the tubular vertical member 42 there is welded or otherwise attached a square tubular housing 180 provided with an upper end wall 182. Slots, as at 184, are provided in the housing 180 for reception of guides 186 mounted on a slide block 188 having a recess 190 therein for reception of the lower sprocket 192 mounted on a shaft 194 journaled in the slide block 188. A spring 196 continuously biases the upper wall 182 of the housing 180 and the slide block 188 so that the conveyor belt 178 may be held taut, the block 188 being capable of upward motion upon compression of the spring 196 should the fingers of a picker or a portion of his clothing or the like, become entangled in the conveyor chains 178.

It is noted that the conveyor chains 178 are composed of links which are loosely rotatably connected to each other in the conventional manner. Mounting brackets, as at 198, are attached to some of the links 200 and are provided with apertures 202 therethrough for reception of fasteners which extend through apertures 204 and the flanges 206 of the substantially U-shaped retainers 208 used for attaching the plates 198 to resilient clips 210. The fasteners utilized in attaching the retainers 208 and the brackets or plates 198 to the clips 210 may be in the form of screws or nails or the like, as indicated at 212. The spring clips 210 are formed of wood with a facing 214 of brass or may be constructed entirely from brass since such material is resistant to corrosive effect of the juices exuded from the tobacco leaves capable of being carried by the clips 210. The body of the clip 210 includes a block provided with a cam face 216 which cooperates with the cam portion 218 of a pivotally mounted clip wire 220 mounted on a shaft 222 within a recess 224 in the clip body. A spring 226 is provided for continuously urging the clip wire 220 into engagement with the facing 214 so that the tobacco leaves will continuously be resiliently held.

Figure 1:
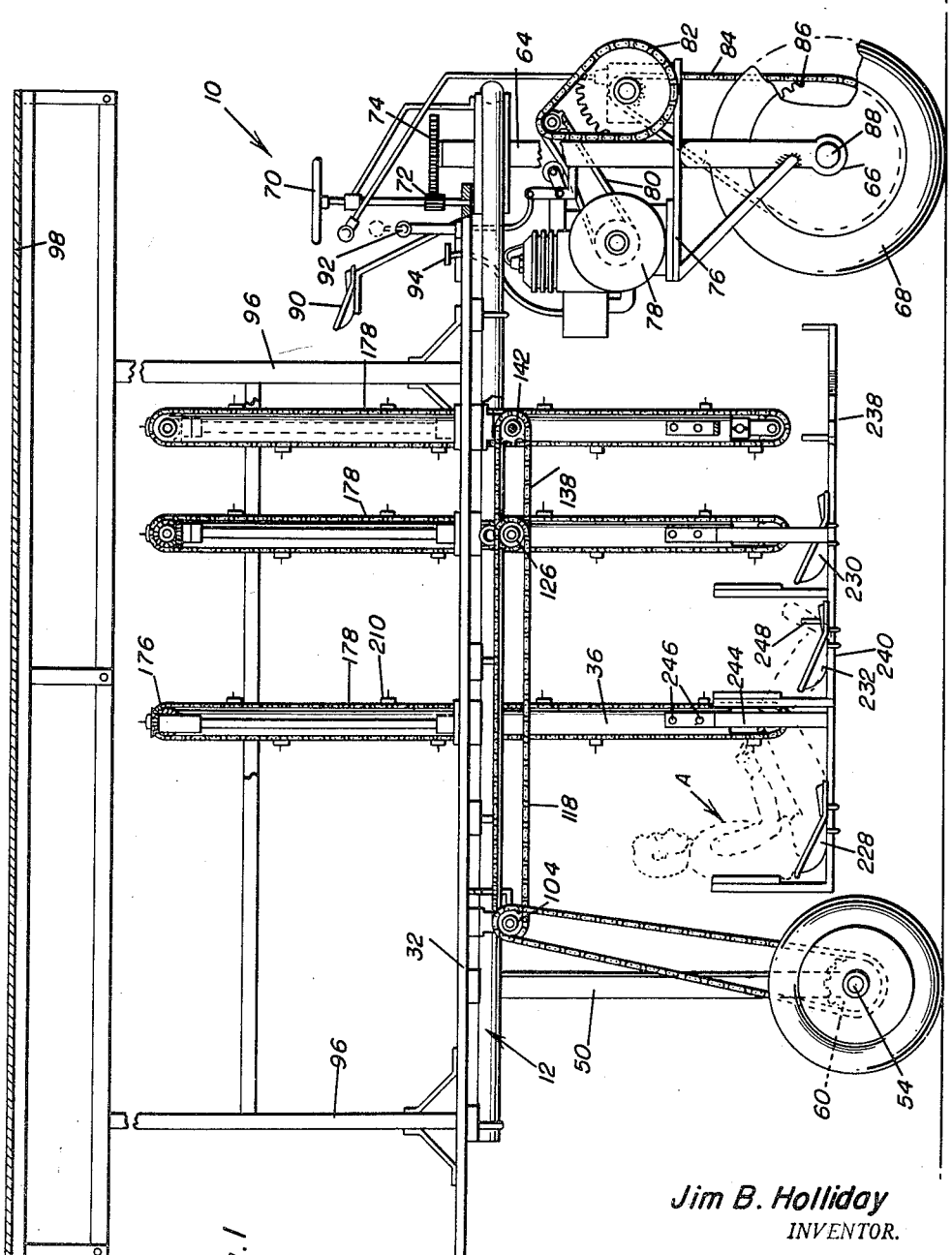
Figure 1 is a side elevational view of the tobacco harvester comprising the present invention.
Figure 2:
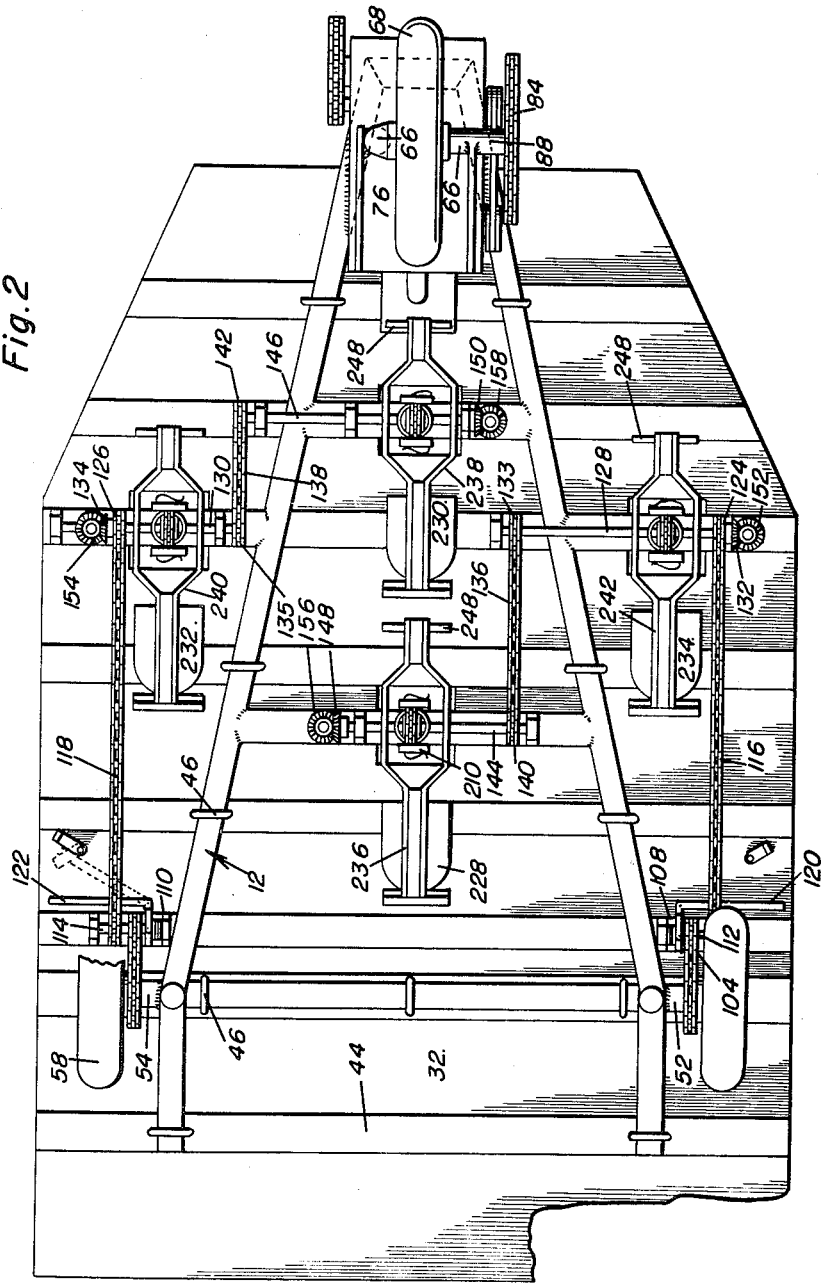
Figure 2 is a bottom plan view illustrating in particular the fundamental relationship of the part of the invention and the manner in which the chain drive system provides means for operating the conveyor chains.

The tobacco leaves are inserted into the clips 214 by pickers seated on seats, as indicated at 228, 230, 232, and 234 suspended from the vertical members 36, 38, 42 and 40, respectively. The seats 228, 230, 232 and 234 are mounted on durable frame-works 236, 238, 240 and 242 carried by vertically extending brackets such as designated at 244 in Figure 1 which are attached by bolts 246 to the vertical members 36, 38, 40 and 42. A plurality of apertures are formed in the vertical members 36, 38, 40 and 42 so that the vertical brackets 244 may be adjustably secured to the vertical members thereby raising or lowering the seats 28, 30, 32 and 34 as may be desired in order to position the picker, as indicated at A, depending upon the state of the tobacco crop. Foot rests 248 are associated with each of the seat supporting frames 236, 238, 240 and 242.

The operation of this machinery is quite simple. After the clutches have been placed in an operative position using the levers 120 and 122, and with the motor 78 driving the harvester, the harvester will move at a rate approximately 2 miles or so per hour. This will actuate the sprockets 60 and 62 driving the chain drive means for actuating the conveyor chains 178. All that is necessary for a picker to do is to insert the stems of the tobacco leaves in the clips 210 and the conveyor chains 178 will hoist the tobacco leaves above the platform 32 whereby subsequent mechanisms and personnel will be utilized to tie the tobacco leaves to tobacco sticks.

A modified form of the tubular vertical members is illustrated in Figure 10 and it is noted that this vertical member 260 is formed of two sections 262 and 264 which are bolted or otherwise fastened to the platform 32 which is apertured as at 266 for reception of a vertical shaft 268. The shaft 268 is thus received within the tubular vertical member 260 thus providing protection for the leaf picker while protecting the shaft. The shaft 268 has bevel gears 270 and 272 thereon for driving other bevel gears on driven shafts for the sprockets of the conveyor chains.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A tobacco harvester comprising a frame, said frame including a pair of spaced side frame members, horizontal frame members secured to said side frame members, spaced vertical members secured to said horizontal frame members, endless conveyor chains carried by said vertical members, and wheel mounting elements secured to said frame, wheels mounted on said elements, drive sprockets mounted on said elements and driven by said wheels, and means connecting said drive sprockets with said chains to actuate said chains, drive shafts rotatably mounted on said frame carrying driven sprockets, chain drive systems connecting said drive sprockets with said driven sprockets to actuate said drive shafts, said chain drive systems including bevel gears on said drive shafts, driven shafts journaled in said vertical members, other bevel gears on said driven shafts engaging said first recited bevel gears to drive said driven shafts, said conveyor actuating sprockets being mounted on stub shafts and means drivingly connecting said driven shafts with said stub shafts.

2. A tobacco harvester comprising a frame, said frame including a pair of spaced side frame members, horizontal frame members secured to said side frame members, spaced vertical members secured to said horizontal frame members, endless conveyor chains carried by said vertical members, and wheel mounting elements secured to said frame, wheels mounted on said elements, drive sprockets mounted on said elements and driven by said wheels, and means connecting said drive sprockets with said chains to actuate said chains, drive shafts rotatably mounted on said frame carrying driven sprockets, chain drive systems connecting said drive sprockets with said driven sprockets to actuate said drive shafts, said chain drive systems including bevel gears on said drive shafts, driven shafts journaled in said vertical members, other bevel gears on said driven shafts engaging said first recited bevel gears to drive said driven shafts, said conveyor actuating sprockets being mounted on stub shafts and means drivingly connecting said driven shafts with said stub shafts, said vertical members being tubular in construction and supporting conveyor actuating sprockets about which said chains are entrained.

3. A tobacco harvester comprising a frame, said frame including a pair of spaced side frame members, horizontal frame members secured to said side frame members, spaced vertical members secured to said horizontal frame members, endless conveyor chains carried by said vertical members, and wheel mounting elements secured to said frame, wheels mounted on said elements, drive sprockets mounted on said elements and driven by said wheels, and means connecting said drive sprockets with said chains to actuate said chains, drive shafts rotatably mounted on said frame carrying driven sprockets, chain drive systems connecting said drive sprockets with said driven sprockets to actuate said drive shafts, said chain drive systems including bevel gears on said drive shafts, driven shafts journaled in said vertical members, other bevel gears on said driven shafts engaging said first recited bevel gears to drive said driven shafts, said conveyor actuating sprockets being mounted on stub shafts and means drivingly connecting said driven shafts with said stub shafts, said vertical members having seats suspended therefrom behind said chains.

4. A tobacco harvester comprising a frame, said frame including a pair of spaced side frame members, horizontal frame members secured to said side frame members, spaced vertical members secured to said horizontal frame members, endless conveyor chains carried by said vertical members, and wheel mounting elements secured to said frame, wheels mounted on said elements, drive sprockets mounted on said elements and driven by said wheels, and means connecting said drive sprockets with said chains to actuate said chains, drive shafts rotatably mounted on said frame carrying driven sprockets, chain drive systems connecting said drive sprockets with said driven sprockets to actuate said drive shafts, said chain drive systems including bevel gears on said drive shafts, driven shafts journaled in said vertical members, other bevel gears on said driven shafts engaging said first recited bevel gears to drive said driven shafts, said conveyor actuating sprockets being mounted on stub shafts and means drivingly connecting said driven shafts with said stub shafts, said chains having spring pressed clips attached thereto for resiliently engaging and carrying tobacco leaves.

5. A tobacco harvester comprising a frame, said frame including a pair of spaced side frame members, horizontal frame members secured to said side frame members, spaced vertical members secured to said horizontal frame members, endless conveyor chains carried by said vertical members, and wheel mounting elements secured to said frame, wheels mounted on said elements, drive sprockets mounted on said elements and driven by said wheels, and means connecting said drive sprockets with said chains to actuate said chains, drive shafts rotatably mounted on said frame carrying driven sprockets, chain drive systems connecting said drive sprockets with said driven sprockets to actuate said drive shafts, said chain drive systems including bevel gears on said drive shafts, driven shafts journaled in said vertical members, other bevel gears on said driven shafts engaging said first recited bevel gears to drive said driven shafts, said conveyor actuating sprockets being mounted on stub shafts and means drivingly connecting said driven shafts with said stub shafts, said chains having spring pressed clips attached thereto for resiliently engaging and carrying tobacco leaves, each of said clips having a clip block, a clip wire pivotally secured to said clip block and having a retaining portion adapted to hold tobacco leaves between said clip wire and said clip block, and resilient means urging said clip wire and said clip block together, said clip wire and said clip block having diverging outer cam portions for enabling insertion of tobacco leaves therebetween while said conveyor chains are in continuous motion.

6. A tobacco harvester comprising a frame, said frame including a pair of spaced side frame members, horizontal frame members secured to said side frame members, spaced vertical members secured to said horizontal frame members, endless conveyor chains carried by said vertical members, and wheel mounting elements secured to said frame, wheels mounted on said elements, drive sprockets mounted on said elements and driven by said wheels, and means connecting said drive sprockets with said chains to actuate said chains, drive shafts rotatably mounted on said frame carrying driven sprockets, chain drive systems connecting said drive sprockets with said driven sprockets to actuate said drive shafts, said chain drive systems including bevel gears on said drive shafts, driven shafts journaled in said vertical members, other bevel gears on said driven shafts engaging said first recited bevel gears to drive said driven shafts, said conveyor actuating sprockets being mounted on stub shafts and means drivingly connecting said driven shafts with said stub shafts, said vertical members being tubular in construction and supporting conveyor actuating sprockets about which said chains are entrained, said vertical members having seats suspended therefrom behind said chains.

7. A tobacco harvester comprising a frame, wheels supporting said frame, vertical members secured to said frame in spaced relationship to each other, vertically extending conveyor chains carried by said vertical members, drive means for actuating said chains, a platform secured on top of said frame, said chains extending upwardly above said platform from therebelow, said chains having spring pressed clips attached thereto for resiliently engaging and carrying tobacco leaves, a plurality of seats, and means adjustably suspending said seats from said vertical members in back of said chains.

JIM B. HOLLIDAY.

References Cited in the file of this patent

UNITED STATES PATENTS

| Number | Name | Date |
|---|---|---|
| 699,408 | Owen | May 6, 1902 |
| 1,134,184 | Cook | Apr. 6, 1915 |
| 1,136,773 | Chapman | Apr. 20, 1915 |
| 1,275,781 | Stark et al. | Aug. 13, 1918 |
| 1,912,232 | Wehrhahn et al. | May 30, 1933 |
| 2,267,234 | Garber | Dec. 23, 1941 |
| 2,378,847 | Harris | June 19, 1945 |
| 2,518,965 | Whitley | Aug. 15, 1950 |
| 2,526,583 | Schlessman | Oct. 17, 1950 |
| 2,533,813 | Jones | Dec. 12, 1950 |